United States Patent
Wang et al.

(10) Patent No.: US 11,562,645 B2
(45) Date of Patent: Jan. 24, 2023

(54) EDGE-ACCELERATED ARTIFICIAL INTELLIGENCE FOR COLLABORATIVE SENSING OF PHYSICAL INTELLIGENT MOVING OBJECTS

(71) Applicant: Fujitsu Limited, Kawasaki (JP)

(72) Inventors: Xi Wang, Murphy, TX (US); Nannan Wang, Allen, TX (US); Paparao Palacharla, Richardson, TX (US); Tadashi Ikeuchi, Plano, TX (US); Soroush Bateni, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 299 days.

(21) Appl. No.: 16/838,449

(22) Filed: Apr. 2, 2020

(65) Prior Publication Data

US 2021/0110710 A1  Apr. 15, 2021

Related U.S. Application Data

(60) Provisional application No. 62/914,789, filed on Oct. 14, 2019.

(51) Int. Cl.
*G08G 1/01* (2006.01)
*G08G 1/0968* (2006.01)
*H04W 4/46* (2018.01)
*H04W 4/48* (2018.01)
*H04W 84/18* (2009.01)

(52) U.S. Cl.
CPC ......... *G08G 1/0112* (2013.01); *G08G 1/0968* (2013.01); *H04W 4/46* (2018.02); *H04W 4/48* (2018.02); *H04W 84/18* (2013.01)

(58) Field of Classification Search
CPC ..... G08G 1/0112; G08G 1/0968; H04W 4/16; H04W 4/48; H04W 84/18
See application file for complete search history.

(56) References Cited

U.S. PATENT DOCUMENTS

| | | | |
|---|---|---|---|
| 9,582,003 B1* | 2/2017 | Levandowski | B60K 28/02 |
| 2019/0316919 A1* | 10/2019 | Keshavamurthy | G08G 1/096844 |
| 2020/0296789 A1* | 9/2020 | Wang | H04W 64/006 |
| 2021/0110710 A1* | 4/2021 | Wang | G08G 1/0112 |
| 2022/0044162 A1* | 2/2022 | Zhang | G06N 20/10 |

* cited by examiner

*Primary Examiner* — Peter D Nolan
*Assistant Examiner* — Wae L Louie
(74) *Attorney, Agent, or Firm* — Fujitsu Patent Center (57) ABSTRACT

Systems and methods for identifying physical intelligent moving objects (IMOs); creating, for a first subset of the physical IMOs, digital representations in edge clouds of a distributed cloud computing environment, each digital representation representative of a physical IMO of the first subset of the physical IMOs; generating a cooperative network computing (CNC) platform that includes the digital representations of the first subset of the physical IMOs, each digital representation functioning as a CNC entity in the CNC platform for the corresponding physical IMO; identifying a CNC task of a first physical IMO of the plurality of physical IMOs; and performing, by a first digital representation of the representations that corresponds to the first physical IMO, the CNC task in the CNC platform, including accessing data associated with a second digital representation of the digital representations in the CNC platform to perform the CNC task at the first digital representation.

16 Claims, 7 Drawing Sheets

EDGE-ACCELERATED ARTIFICIAL INTELLIGENCE FOR COLLABORATIVE SENSING OF PHYSICAL INTELLIGENT MOVING OBJECTS

CROSS-REFERENCE TO RELATED APPLICATION(S)

This application claims the benefit of U.S. Provisional Ser. No. 62/914,789 filed on Oct. 14, 2019, the disclosure of which is expressly incorporated herein by reference in its entirety.

FIELD OF THE DISCLOSURE

The present disclosure relates generally to the creation and implementation of digital representations of physical intelligent moving objects, and specifically, edge-accelerated artificial intelligence for collaborative sensing of physical intelligent moving objects such as connected/autonomous vehicles.

DESCRIPTION OF THE RELATED ART

Emerging technologies (e.g., autonomous vehicles, industrial IoT, robotics, etc.) are driving strong demands on the network and cloud infrastructures. A new wave of Intelligent Moving Objects (IMOs) such as connected/self-driving cars, drones, and robots rely heavily on the network and cloud for maximizing their performance/functionalities. IMOs are high-functionality mobile terminals that have built-in computing/networking/sensing/maneuvering capabilities. IMOs in different cases can have vastly different QoS (Quality of Service) requirements such as response time, processing load, up/down link bandwidth, and network/service availability. To satisfy such heterogeneous service needs, a new distributed cloud and network architecture called multi-access edge computing (MEC) has recently been proposed. By running applications and performing related processing tasks closer to the mobile terminals, network congestion is reduced, and applications perform better.

Today, physical IMOs such as connected cars interact directly with data/applications in the central cloud (e.g., V2I (Vehicle-to-Infrastructure)) and/or with other IMOs (e.g., V2V (Vehicle-to-Vehicle)). However, such environments can lead to too much network traffic and too much service delay for V2I; and unreliable and limited-range communication for V2V. In some V2I deployments today, a connected car needs to obtain the nearby (several hundreds of feet away) traffic signal information through sequential access of multiple remote clouds, some of which are thousands of miles away. The current dedicated short-range communications (DSRC) typically supports only up to several hundreds of meters of effective communication range and several hundreds of neighboring cars, beyond which V2V communication is either unreachable or unreliable.

SUMMARY

Innovative aspects of the subject matter described in this specification may be embodied in methods that include the actions of identifying a plurality of physical intelligent moving objects (IMOs); creating, for a first subset of the physical IMOs, a plurality of digital representations in one or more edge clouds of a distributed cloud computing environment, each digital representation representative of a physical IMO of the first subset of the physical IMOs; generating a cooperative network computing (CNC) platform that includes the digital representations of the first subset of the physical IMOs, each digital representation functioning as a CNC entity in the CNC platform for the corresponding physical IMO; identifying a CNC task of a first physical IMO of the plurality of physical IMOs; and performing, by a first digital representation of the plurality of digital representations that corresponds to the first physical IMO, the CNC task in the CNC platform, including accessing data associated with a second digital representation of the plurality of digital representations in the CNC platform to perform the CNC task at the first digital representation.

Other embodiments of these aspects include corresponding systems, apparatus, and computer programs, configured to perform the actions of the methods, encoded on computer storage devices.

These and other embodiments may each optionally include one or more of the following features. Performing the CNC task includes relaying data, by the first digital representation, to a third digital representation of the plurality of digital representations. Performing the CNC task includes caching, at the first digital representation, the data accessed from the second digital representation of the plurality of digital representations. Performing the CNC task includes relaying, at the first digital representation, data resulting from a function implemented to perform the CNC task at the first digital representation to a third digital representation of the plurality of digital representations. Performing the CNC task includes caching, at the first digital representation, data resulting from a function implemented to perform the CNC task at the first digital representation. Creating, for a second subset of the physical IMOs, a respective digital representation of the physical IMO in a core cloud of the distributed cloud computing environment, wherein generating the CNC platform further includes generating the CNC platform that includes the digital representations of the first and the second subset of the physical IMOs. Creating, for a second subset of the physical IMOs, a respective digital representation of the physical IMO at the physical IMO, wherein generating the CNC platform further includes generating the CNC platform that includes the digital representations of the first and the second subset of the physical IMOs. Creating, for a second subset of the physical IMOs, a respective digital representation of the physical IMO in a core cloud of the distributed cloud computing environment; and creating, for a third subset of the physical IMOs, a respective digital representation of the physical IMO at the physical IMO, wherein generating the CNC platform further includes generating the CNC platform that includes the digital representations of the first subset, the second subset, and the third subset of the physical IMOs.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

This document describes methods, systems, and computer readable medium for a digital representation (DR) of a physical intelligent moving object (IMO) for multi-access edge computing. The DR is a service-oriented virtual IMO that resides in the edge cloud, and includes data (e.g., state), service logic (e.g., decision making), and virtual agility (e.g., migration). The DR can interact with the cloud computing environment and other DRs on behalf of the physical IMO. In some examples, physical intelligent moving objects are high-functionally mobile terminals that can include built-in computing/networking/sensing/maneuvering capabilities. In some examples, physical intelligent moving objects are products, assets and other things embedded with processors, sensors, software and connectivity that allow data to be exchanged between the product and its environment, manufacturer, operator/user, and other products and systems.

In some examples, collaborative sensing can be a feature for the physical IMOs. For example, a group of physical IMOs (such as connected vehicles) can share real-time sensor data (e.g., camera, radar, LIDAR, etc.) to build collective situational awareness; and for improved safety (e.g., see-through video sharing/cooperative collision avoidance) and operational performance (e.g., high-density platooning/signal-less intersection). The system of this document can provide such collaborative sensing while maintaining privacy (security/trust) during sharing of raw sensor data. Further, the system of this document can minimize and/or prevent computing/networking capacity issues—raw sensor data sharing through direct V2V can require large wireless network capacity (e.g., 1 Gb/s per vehicle pair), and large in-vehicle computing power (e.g., perform object recognition on incoming raw video streams from neighboring cars).

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
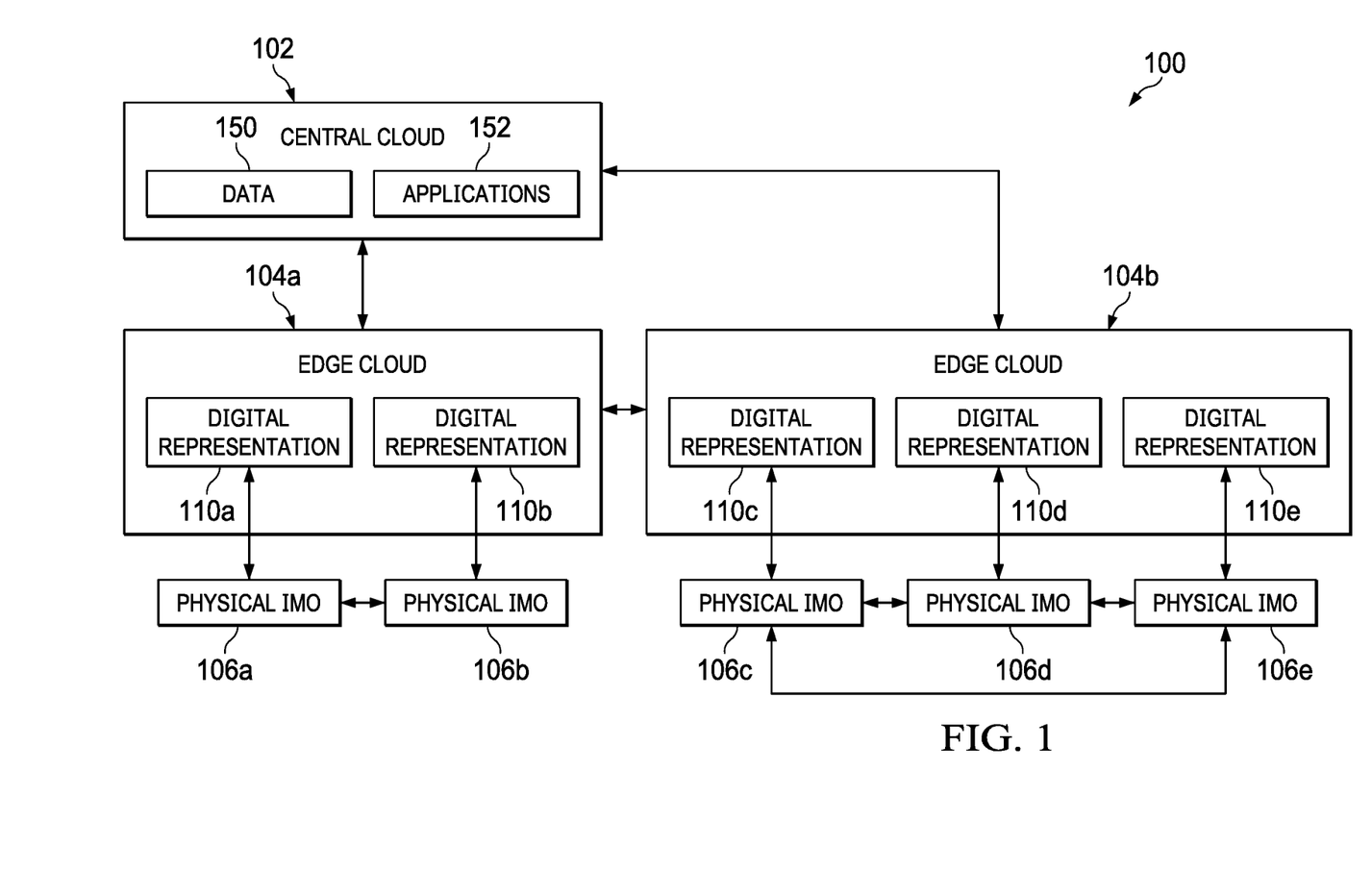
FIG. 1 is a block diagram of selected elements of a computing environment including a central cloud computing network and edge cloud computing networks.

FIG. 1 illustrates a computing environment 100. The computing environment 100 can include a central (or core) cloud computing network 102 (or central cloud 102), a first edge cloud computing network 104a and a second edge cloud computing network 104b (collectively referred to as edge cloud computing networks 104, or edge clouds 104), and physical intelligent moving objects (IMO) 106a, 106b, 106c, 106d, 106e (collectively referred to as physical IMOs 106). The central cloud 102 can include data 150 and applications 152 for interaction between the central cloud 102 and the edge clouds 104.

The edge cloud 104a can be in communication with the central cloud 102, the edge cloud 104b, and the physical IMOs 106a, 106b. The edge cloud 104b can be in communication with the central cloud 102, the edge cloud 104a, and the physical IMOs 106c, 106d, 106e. The physical IMOs 106a, 106b can be in communication with each other; and the physical IMOs 106c, 106d, 106e can be in communication with each other.

The computing environment 100 can further include digital representations ("digital genies") that are virtual IMOs that implement (or mirror) a specific set of functions/services of the corresponding physical IMO. In the illustrated example, a digital representation 110a corresponds to (represents) the physical IMO 106a; a digital representation 110b corresponds to (represents) the physical IMO 106b; a digital representation 110c corresponds to (represents) the physical IMO 106c; a digital representation 110d corresponds to (represents) the physical IMO 106d; and a digital representation 110e corresponds to (represents) the physical IMO 106e. The digital representations 110a, 110b, 110c, 110d, 110e can be collectively referred to as digital representations (DRs) 110.

In short, the digital representations 110 i) are created in the edge cloud 104 that has a direct network connection with the physical IMO 106; ii) reside in the edge cloud 104 closest to the physical IMO 106 for low latency responsiveness (however, in some examples, the digital representations 110 can reside in the cloud network 102 or a "fog" network); iii) includes virtual agility (e.g., migration, duplication, split, and merge following physical IMO 106 movement and/or changing service needs); iv) have omnidirectional communication interfaces (to the physical IMO 106, to the cloud network 102, and to other digital representations 110); and v) can direct exchange/invoke data/functions with other digital representations 110, the physical IMO 106, and/or the cloud network 102. In some examples, the digital representations 110 include three internal elements: data (e.g., current/last-know states of the corresponding physical IMO 106); service logic (e.g., control of access to the data); and virtual agility.

The central cloud 102 and the edge clouds 104 can include computing processors (not shown) and memory media (not shown), which may store executable instructions (i.e., executable code) that may be executable by the processor, which has access to the memory media. The processor may execute instructions that cause a network management system to perform the functions and operations described herein. For the purposes of this disclosure, the memory media may include non-transitory computer-readable media that stores data and instructions for at least a period of time. The memory media may comprise persistent and volatile media, fixed and removable media, and magnetic and semiconductor media. The memory media may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. The memory media is operable to store instructions, data, or both. The memory media as shown includes sets or sequences of instructions that may represent executable computer programs, namely, the digital representations 110. That is, the processors can implement the digital representations 110, that are stored by the memory media.

Each of the central cloud 102 and the edge clouds 104 can include a network interface (not shown) which may be a suitable system, apparatus, or device operable to serve as an interface between the central cloud 102, the edge clouds 104, and the physical IMOs 106. The network interface may enable communications using a suitable transmission protocol or standard. In certain embodiments, the central cloud 102 and/or the edge clouds 104 may include at least certain portions of a public network, such as the Internet, and can be implemented using hardware, software, or various combinations thereof.

Figure 2:
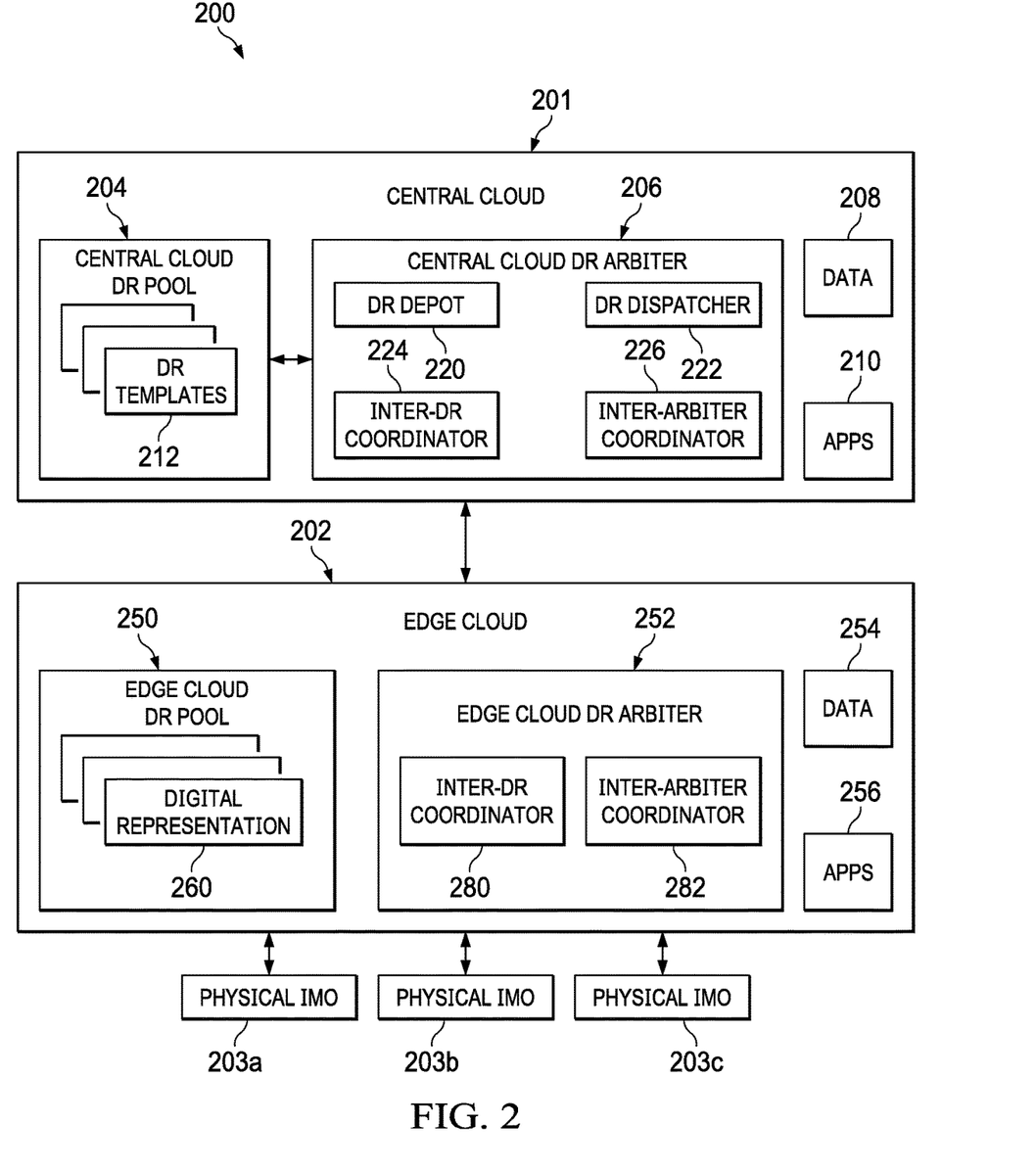
FIG. 2 is a block diagram of selected elements of a computing environment including components of the central cloud computing network and the edge cloud computing networks.

FIG. 2 illustrates a computing environment 200, similar to the computing environment 100 of FIG. 1. The computing environment 200 can include a central cloud computing network 201 (similar to the central cloud computing network 102), an edge cloud computing network 202 (similar to the edge cloud computing network 104), and physical IMOs 203a, 203b, 203c (collectively referred to as physical IMOs 203; similar to the physical IMOs 106). In some examples, the environment can include any number of edge cloud computing networks 202.

The central cloud computing network 201 (or central cloud 201) can include a central cloud digital representation (DR) template pool 204, a central cloud digital representation (DR) arbiter 206, data 208, and applications 210. The central cloud DR template pool 204 can host digital representation (DR) templates 212; and the central cloud DR arbiter 206 can manage the DR templates 212. Memory media of the central cloud 201 can include sets or sequences of instructions that may represent executable computer programs, namely, the central cloud DR arbiter 206. That is, the processor(s) of the central cloud 201 can implement the central cloud DR arbiter 206 that are stored by the memory media. Further, the memory media can store the central cloud DR template pool 204.

The edge cloud computing network 202 (or edge cloud 202) can include an edge cloud digital representation (DR) instance pool 250, an edge cloud digital representation (DR) arbiter 252, data 254, and applications 256. The edge cloud DR instance pool 250 can host digital representation (DR) instances 260; and the edge cloud DR arbiter 252 can manage the DR instances 260. Memory media of the edge cloud 202 can include sets or sequences of instructions that may represent executable computer programs, namely, the edge cloud DR arbiter 252. That is, the processor(s) of the edge cloud 202 can implement the edge cloud DR arbiter 252 that are stored by the memory media. Further, the memory media can store the edge cloud DR instance pool 250.

To that end, as the edge cloud computing network 202 (or edge cloud 202) is dynamic, the central cloud 201 can manage the DR templates 212 that are used to create the DR instances 260. Specifically, the DR arbiter 206 includes a DR depot 220 that creates the DR templates 212 (that are included by the DR template pool 204) based on the service requests of the physical IMOs 206; a DR dispatcher 222 that creates the DR instances 260 and dispatches the same to the destination clouds (e.g., the edge cloud 202); an inter-DR coordinator 224 that coordinates DR interactions within the same cloud (e.g., the edge cloud 202); and an inter-arbiter coordinator 226 that coordinates interactions with DG arbiters (e.g., DR arbiter 206) in other clouds (e.g., other edge clouds 202). For example, the inter-DR coordinator 224 can facilitate DR interactions within the same edge cloud 202 such as enabling the DR instances 260 of the same cloud (e.g., the edge cloud 202) in finding each other; and the inter-arbiter coordinator 226 can facilitate locating a DR instance 260 that has migrated to a neighboring edge cloud (e.g., from the edge cloud 202).

The edge cloud DR arbiter 252 can include an inter-DR coordinator 280 that coordinates DR interactions within the same cloud (e.g., the edge cloud 202); and an inter-arbiter coordinator 282 that coordinates interactions with the DG arbiter (e.g., DG arbiter 206) in other clouds (e.g., other edge clouds 202). The DR instances 260 that are stored by the edge cloud DR instance pool 250 can provide services to the physical IMOs 203.

In some implementations, the physical IMOs 203 can be associated with a current location and a service request. The current location can include a physical location of the physical IMOs 206 in the real-world, or with respect to other objects in the real-world (e.g., other physical IMOs), or with respect to cloud computing networks (e.g., the edge cloud 202). The service request can be associated with a particular (or singular) type of service that is associated with the physical IMO 203. For example, when the physical IMO 206 includes a self-driving car, the service request can include one service associated with the self-driving car such as braking, steering, acceleration, etc.

In some implementations, the DR arbiter 206, and specifically, the DR depot 220, creates, based on a specific set of functions/services of the physical IMOs 203, the DR templates 212 that contain such functions/services. The DR arbiter 206, and specifically, the DR dispatcher 222, can create a particular DR instance 260 of a particular physical IMO 203 based on a particular DR template 212. Specifically, for a particular IMO 203 and a service request of the particular IMO 203, the DR arbiter 206 creates the particular DR instance 260 from the particular DR template 212 that corresponds to such a service request. In some examples, the particular DR instance 260 is an "embodiment" of the particular DG template 212—similar to the creation of an object from a class (as in a computer program).

Additionally, the particular DR instance 260 can be created for a particular edge cloud (e.g., edge cloud 202) that is physically closest to the current location of the particular IMO 203. That is, the environment 200 can include multiple edge clouds, and the particular DR instance 260 is created in the edge cloud (e.g., edge cloud 202) that is located closest to the particular physical IMO 203. That is, each edge cloud can cover, or include, a certain geographic area, with the physical IMOs 203 physically positioned within one of the geographic areas at a time (however, the physical IMOs can move between the geographic areas). To that end, the particular DR instance 260 is created in the edge cloud that covers, or includes, the geographic area the corresponding IMO 203 is physically located in.

In some implementations, in response to creating the particular DR instance 260 of the particular physical IMO 203, the DR arbiter 206 establishes and maintains a network connection between the particular DR instance 260 and the particular physical IMO 203. Specifically, the DR arbiter 206 provides information (e.g., IP address/URL, etc.) for the particular physical IMO 203 to establish a network connection with the particular DR instance 260. The particular DR instance 260 maintains a constant network connection with the particular physical IMO 203 to provide edge computing service. Further, the particular physical IMO 203 and the particular DR instance 260, over the network connection, can exchange data (e.g., a state of the physical IMO 203) and intents (e.g., decisions made by the computing logic of the particular DR instance 260).

In some examples, in response to creating the particular DR instance 260 of the particular physical IMO 203, the DR arbiter 206 establishes (and maintains) a network connection between the particular DR instance 260 and the central cloud 201. In some examples, in response to creating the particular DR instance 260 of the particular physical IMO 203, the DR arbiter 206 establishes (and maintains) a network connection between other DR instances 260 of other physical IMOs 203 and the particular DR instance 260 using the edge cloud 202 (e.g., through an exposed API of the DR instances 260). In other words, the particular DR instance 260 has an omnidirectional communication interface. For example, the particular DR instance 260 is able to have communications interfaces with i) the central cloud 201 (north communication interface), ii) the particular physical IMO 203 (south communication interface), and iii) other DR instances 260 (east-west communication interface) located within the edge cloud 202.

In some implementations, the particular DR instance 260 can detect movement of the corresponding particular physical IMO 203 from coverage of the particular edge cloud 202. Specifically, the particular DR instance 260 can detect, via location information from the particular physical IMO 203, that the particular physical IMO 203 is moving from the current coverage provided by the particular edge cloud 202. That is, there can be multiple edge clouds (e.g., the edge cloud 202) that are near the service areas of the physical IMOs 203 mobility area, and the physical IMO 203 is mobile and is able to migrate between such multiple edge clouds.

In some implementations, in response to detecting the movement of the particular physical IMO 203, the particular DR instance 260 identifies a target edge cloud for coverage of the particular physical IMO 203. The particular DR instance 260 can identify the target edge cloud (e.g., edge cloud 202) based on a predicted direction and trajectory of the particular physical IMO 203 within the geographic areas. The particular DR instance 260 further establishes and maintains a network connection with the particular physical IMO 203 using the target edge cloud.

Figure 3:
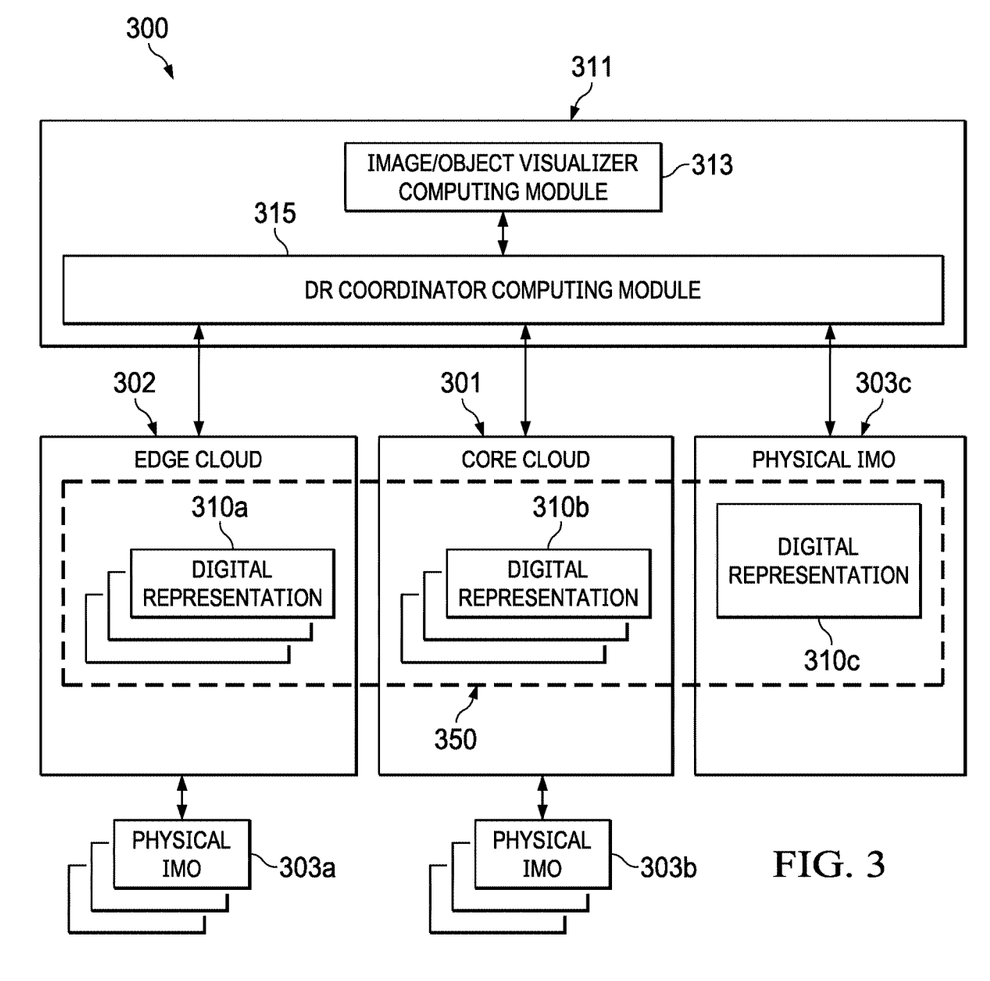
FIG. 3 is a block diagram of selected elements of a computing environment including a cooperative network computing platform.

FIG. 3 illustrates a computing environment 300, similar to the computing environment 100 of FIG. 1 and the computing environment of 200 of FIG. 2. The computing environment 300 can include a central (or core) cloud computing network 301 (similar to the central cloud computing network 102), an edge cloud computing network 302 (similar to the edge cloud computing network 104), and physical IMOs 303a, 303b, 303c (collectively referred to as physical IMOs 303; similar to the physical IMOs 106). In some examples, the environment 300 can include any number of edge cloud computing networks 302.

The edge cloud 302 can be in communication with the central cloud 301, and the physical IMOs 303a. The core cloud 301 can be in communication with the physical IMOs 303b. The physical IMO 303c can be in communication with the edge cloud 302 and/or the core cloud 301. The physical IMOs 303 can be in communication with each other.

The environment 300 can further include a computing system 311 that includes an image/object visualizer computing module 313 and a digital representation (DR) coordinator computing module 315. In some examples, the computing system 311 can be separate from the core cloud 301 and/or the edge cloud 302. In some examples, the computing system 311 is included by the core cloud 301. In some examples, the computing system 311 is included by the edge cloud 302. In some examples, the computing system 311 is included by both the core cloud 301 and the edge cloud 302. The image/object visualizer computing module 313 can, based on image(s)/video(s) data associated with one of the physical IMOs 303, can perform image analysis of the image/video for object detection within the image.

The computing environment 300 can further include digital representations ("digital genies") that are virtual IMOs that implement (or mirror) a specific set of functions/services of the corresponding physical IMO. In the illustrated example, digital representations 310a correspond to (represents) respective physical IMOs 303a; digital representations 310b correspond to (represents) respective physical IMOs 303b; and a digital representation 310c corresponds to (represents) the physical IMO 303c. The digital representation 310a can be included by the edge cloud 302; the digital representation 310b can be included by the core cloud 301; and the digital representation 310c can be included by the physical IMO 303c. The digital representations 310a, 310b, 310c can be collectively referred to as digital representations (DRs) 310. The digital representation coordinator computing module 315 can be in communication with each of the digital representations 310, the edge cloud 302, the core cloud 301, and/or one or more of the physical IMOs 303. The digital representation coordinator computing module 315 can facilitate performing cooperative network computing (CNC) tasks of the physical IMOs 303 at the digital representations 310, described further herein.

In short, the environment 300 can facilitate offloading of collaborating sensing tasks from the physical IMOs 303 to the digital representations 310 and accelerate such by the environment 300. The digital representations 310 can utilize the computational resources of the edge cloud 302 and/or the core cloud 301 (such as a graphical processing unit (GPU)) to perform deep neural network (DNN) object recognition based on sensor data of the respective physical IMOs 303. Further, the environment 300 can facilitate collaboratively sharing (reuse/verify) of "sensed knowledge" between the digital representations 310 through a local object map. By utilizing edge-accelerated artificial intelligence (AI) for collaborative sensing, the environment 300 provides i) privacy enforcement—knowledge sharing as opposed to raw data sharing; ii) confidence/trust boosting—distributed verification on collaboratively sensed knowledge; and iii) performance acceleration—offloading of computing/networking-heaving AI tasks to the edge and cache/reuse results.

In some implementations, the DR coordinator computing module 315 can generate a cooperative network computing (CNC) platform 350. The CNC platform 350 can include the digital representations 310. In some examples, the CNC platform 350 includes any combination of the digital representations 310a, 310b, and 310c. Each of the digital representations 310 can function as a CNC entity in the CNC platform 350 for the corresponding physical IMO 303. In short, the physical IMOs 303 (such as self-driving cars, drones, robots, and other mobile Internet-of-Things (IoT) devices) can rely on the core cloud 301 and the edge cloud 302 to perform CNC tasks. The digital representation-based CNC platform 350 can facilitate supporting the physical IMOs 303 heterogenous CNC needs. In some cases, the digital representations 310 can be a functional representation of a physical IMO's 303 CNC features including: i) a digital representation 310 represents it's host physical IMO 303 as a CNC entity in the CNC platform 350; and ii) a digital representation 310 facilitates it's host physical IMO 303 CNC task in the CNC platform 350.

Figure 4:
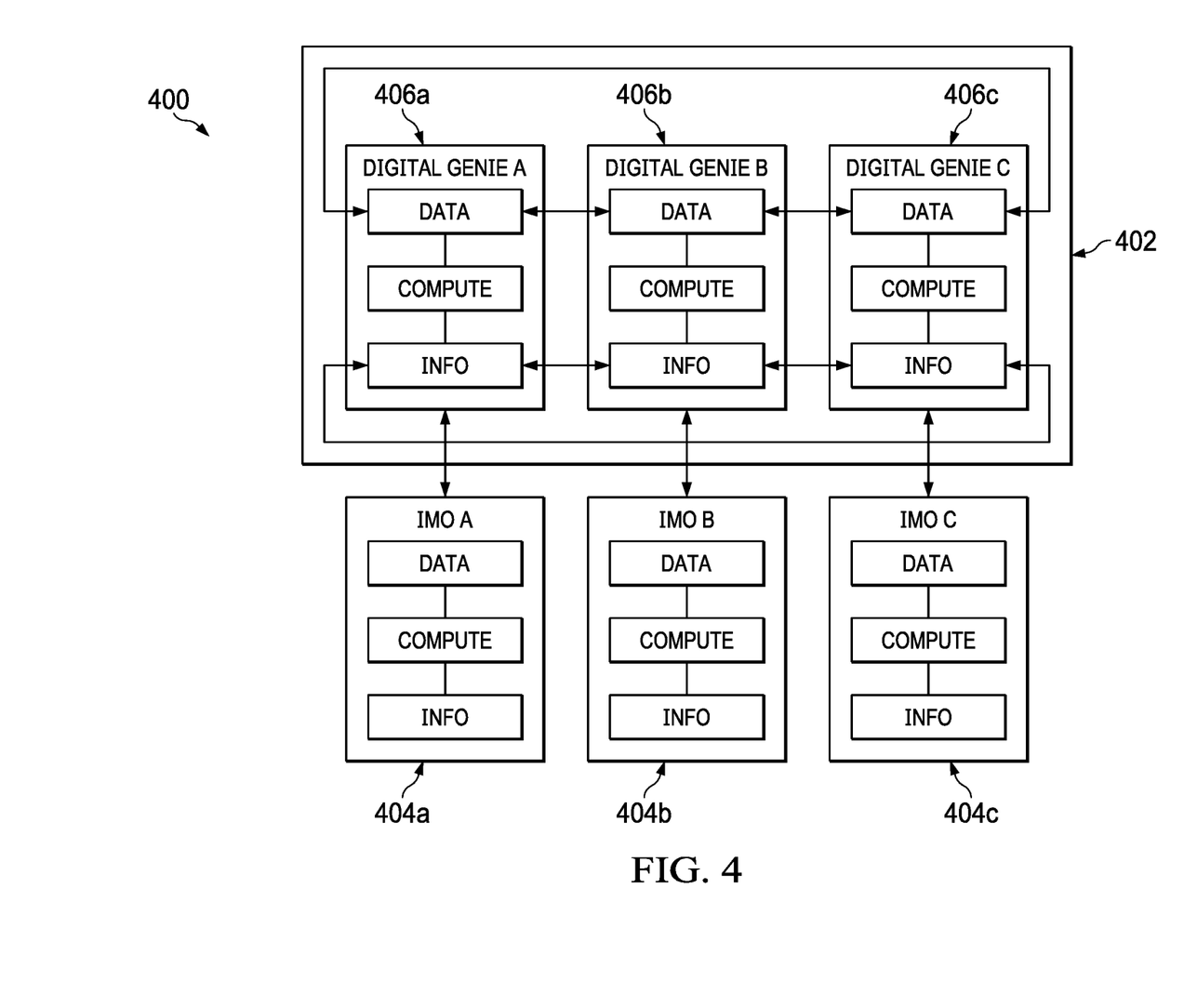
FIG. 4 is a block diagram of a cooperative network computing platform.

FIG. 4 illustrates an example computing environment 400 that includes a CNC platform 402, similar to the CNC platform 350 of FIG. 3. The computing environment can include physical IMOs 404a, 404b, 404c (collectively referred to as physical IMOs 404; similar to physical IMOs 303). The CNC platform 402 can include digital representations 406a, 406b, 406c (collectively referred to as digital representations 406; similar to digital representations 310). The digital representation 406a corresponds to (represents) the physical IMO 404a; the digital representation 406b corresponds to (represents) the physical IMO 404b; and the digital representation 406c corresponds to (represents) the physical IMO 404c.

The physical IMOs 404 can be associated with CNC tasks that are to be performed. The digital representations 406 (CNC entities 406) can perform such CNC tasks of the corresponding physical IMOs 404 in the CNC platform 402. Each of the digital representations 406 can be in communication with one another, e.g., over one or more networks. In short, the digital representations 406 can cooperatively perform network computing task (e.g., a CNC task) to achieve individual and/or group goals (e.g., of one or more of the digital representations 406 and the corresponding physical IMOs 404). Each digital representation 406 can rely on or more of the remaining digital representations 406 data/information to obtain its own information. For example, digital representation 406b can utilize the data of digital representation 406c to compute information requested by digital representation 406a. A CNC task can be decomposed into multiple CNC tasks, similarly a CNC task can be decomposed into multiple N (networking) and C (computing) tasks.

Referring back to FIG. 3, the digital representations 310 can perform the CNC tasks in the CNC platform 350. That is, the digital representations 310 can represent the corresponding physical IMOs 303 as CNC entities in the CNC platform 350 to facilitate performing the CNC task in the CNC platform 350. In some examples, performing the CNC task in the CNC platform 350 by a first digital representation 310 can include accessing data associated with a second digital representation 310 to perform the CNC task at the first digital representation 310.

Figure 5:
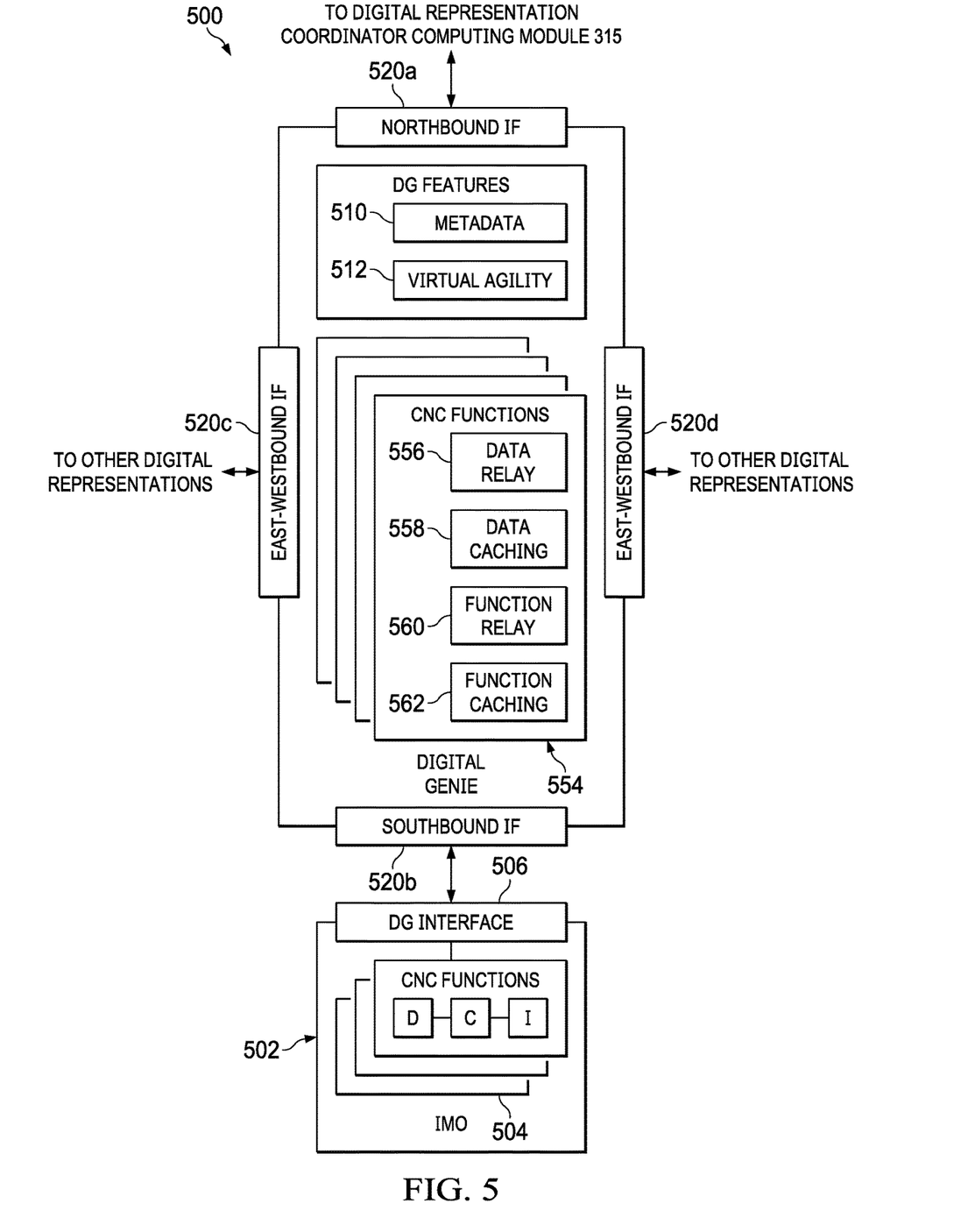
FIG. 5 is a block diagram of a digital representation of the cooperative network computing platform.

Specifically, FIG. 5 illustrates an example digital representation 500, similar to any of the digital representations 110, 260, 310, or 406, in communication with a physical IMO 502, similar to any of the physical IMOs 106, 203, 303, or 404. The physical IMO 502 can include CNC functions 504, and a digital representation interface 506 for communicating with the digital representation 500. To that end, the digital representation 500 can include CNC functions 554 that correspond to the CNC functions 504 of the physical IMO 502. Specifically, the CNC functions 554 of the digital representation 500 can include a data relay computing module 556, a data caching computing module 558, a function relay computing module 560, and a function caching computing module 562, described further herein.

The digital representation 500 can further include metadata 510, and a virtual agility computing module 512 (e.g., migration, duplication, split, and merge following physical IMO 502 movement and/or changing service needs). The digital representation 500 can further include communication interfaces (e.g., APIs) for the digital representation 500 to interact with external entities. The digital interface can include a northbound communication interface 520a (e.g., to the digital representation coordinator computing module 315), a southbound communication interface 520b (to the physical IMO 502), and east-westbound communication interfaces 520c, 520d (to other digital representations).

To that end, performing the CNC task of the physical IMO 502 by the digital representation 500 can include relaying data from the digital representation 500 to another digital representation in communication with the digital representation 500. The data relay computing module 556 can relay data from the digital representation 500 to another digital representation. Specifically, the data relay computing module 556 can relay data directly from the physical IMO 502 to other digital representations 500 (e.g., using the interfaces 520c, 520d). Such data can include an image, video, or object map of such image/video.

Performing the CNC task of the physical IMO 502 by the digital representation 500 can include caching, at the digital representation 500, data accessed from other digital representations (e.g., received using the interfaces 520c, 520d). The data caching computing module 558 can cache previously received/exchanged data from the other digital representations. As a result, repeated communications between digital representations is minimized and/or prevented for requests of the same data as this data can be stored by the digital representation 500 as provided by the data caching computing module 558. Such data can include an image, video, or object map of such image/video.

Performing the CNC task of the physical IMO 502 by the digital representation 500 can include relaying, at the digital representation 500, data resulting from a function implemented to perform the CNC task at the digital representation 500 to other digital representations (e.g., using the interfaces 520c, 520d). The function relay computing module 560 can relay information that is computed at the digital representation 500 with other digital representations (e.g., using the interfaces 520c, 520d). For example, a neural network computation can be performed at the digital representation 500 (e.g., analyzing an object of an image). The computational result can be relayed to other digital representations by the function relay computing module 560. Such data can include an image, video, or object map of such image/video.

Performing the CNC task of the physical IMO 502 by the digital representation 500 can include caching, at the digital representation 500, data resulting from a function implemented to perform the CNC task at the digital representation 500. The function caching computing module 562 can cache information that is computed at the digital representation 500. As a result, repeated communications between digital representations is minimized and/or prevented for performing such functions to obtain the data. Furthermore, repeated computations related to such function for determining such information is minimized and/or prevented. For example, calculation of object mapping of a given image is performed once and cached at the digital representation 500.

Figure 6:
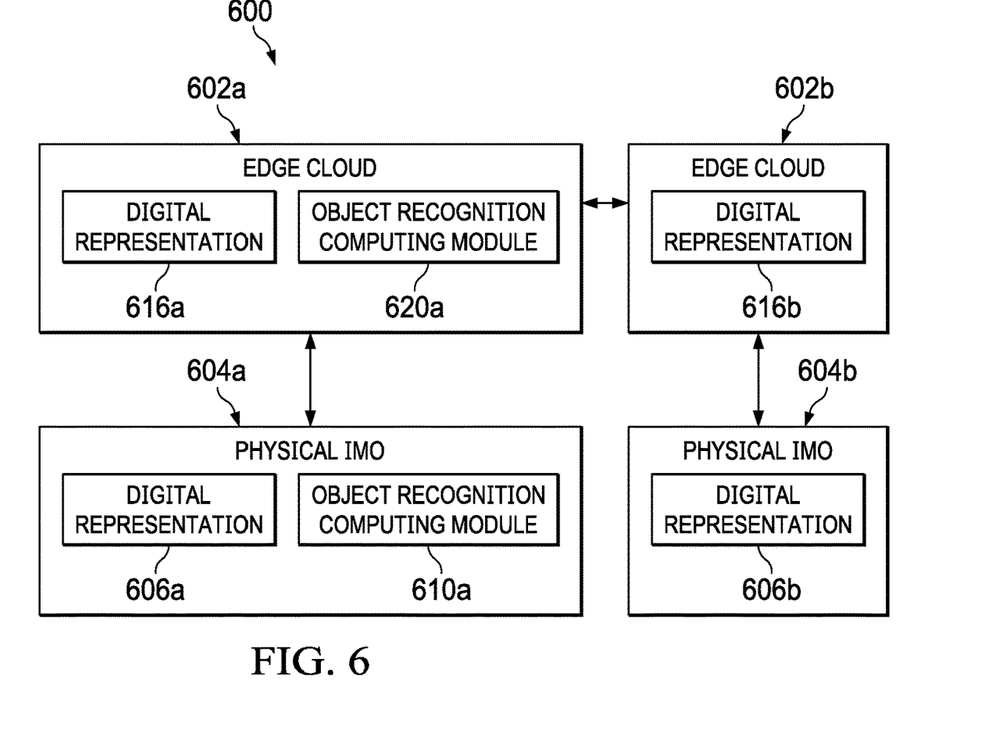
FIG. 6 is a block diagram of selected elements of a computing environment including edge cloud computing networks.

FIG. 6 illustrates a computing environment 600 including edge clouds 602a, 602b (collectively referred to as edge clouds 602; similar to any of edge clouds 104, 202, 302); and physical IMOs 604a, 604b (collectively referred to physical IMOs 604; similar to any of physical IMOs 106, 203, 303, 404, 502). The edge cloud 602a can be in communication with the physical IMO 604a; and the edge cloud 602b can be in communication with the physical IMO 604b. The edge clouds 602 can be in communication with one another.

The physical IMO 604a can include a local digital representation 606a of the physical IMO 604a and a local object recognition computing module 610a; and the physical IMO 604b can include a local digital representation 606b of the physical IMO 604b. The local digital representations 606a, 606b (collectively referred to as local digital representations 606) can provide minimum performance safety of the respective physical IMO 604 without remoting to the edge clouds 602. That is, the local digital representations 606 can perform localized CNC tasks. The edge cloud 602a can include a remote digital representation 616a of the physical IMO 604a and a remote object recognition computing module 620a; and the edge cloud 602b can include a remote digital representation 616b of the physical IMO 604b. The remote digital representations 616a, 616b (collectively referred to as remote digital representations 616) can provide high-precisions computational tasks for the physical IMOs 604.

In some examples, the local digital representations 606a can selectively determine whether to send an image(s) (e.g., obtained at the physical IMO 604a by a camera computing module) to the local object recognition module 610a or to the remote object recognition computing module 620a. In some cases the local object recognition module 610a can process a subset of the images of a video due to limited power of an onboard GPU of the remote object recognition computing module 620a; or can detect a subset of the objects of the images. When the local digital representation 606a sends the image(s) to the remote object recognition computing module 620a, the remote object recognition computing module 620a can process the image for object detection, and provide an object map for the image(s) to the local digital representation 606a. In some cases, the remote digital representation 616a can determine that the image has been previously processed, and provide a cache of pre-calculated results of the object map to the local digital representation 606a.

In some cases, a physical IMO does not include (be independent of) a local object recognition computing module; and the corresponding edge cloud 602b does not include a remote object recognition computing module for the physical IMO. For example, the physical IMO 604b does not include a local object recognition computing module. To that end, the local digital representation 606b of the physical IMO 604b can transmit an image (or video) captured at the physical IMO 604b (e.g., by a camera computing module) to the remote digital representation 616b. The remote digital representation 616b can transmit (or share) such images (or video) with the remote digital representation 616a. In some cases, the remote digital representation 616a shares a hash of the images, or a RAW version of the images, with the remote digital representation 616a. The remote object recognition computing module 620a can perform image analysis of the hash of the image (or video) obtained at the physical IMO 604b to generate an object map of the image (or video). The remote digital representation 616a can provide such object map to the local digital representation 606b through the remote digital representation 606a; and, in some cases, to the local digital representation 606a as well. Thus, the local digital representation 606b of the physical IMO 604b can receive an object map without having a local object recognition computing module.

Figure 7:
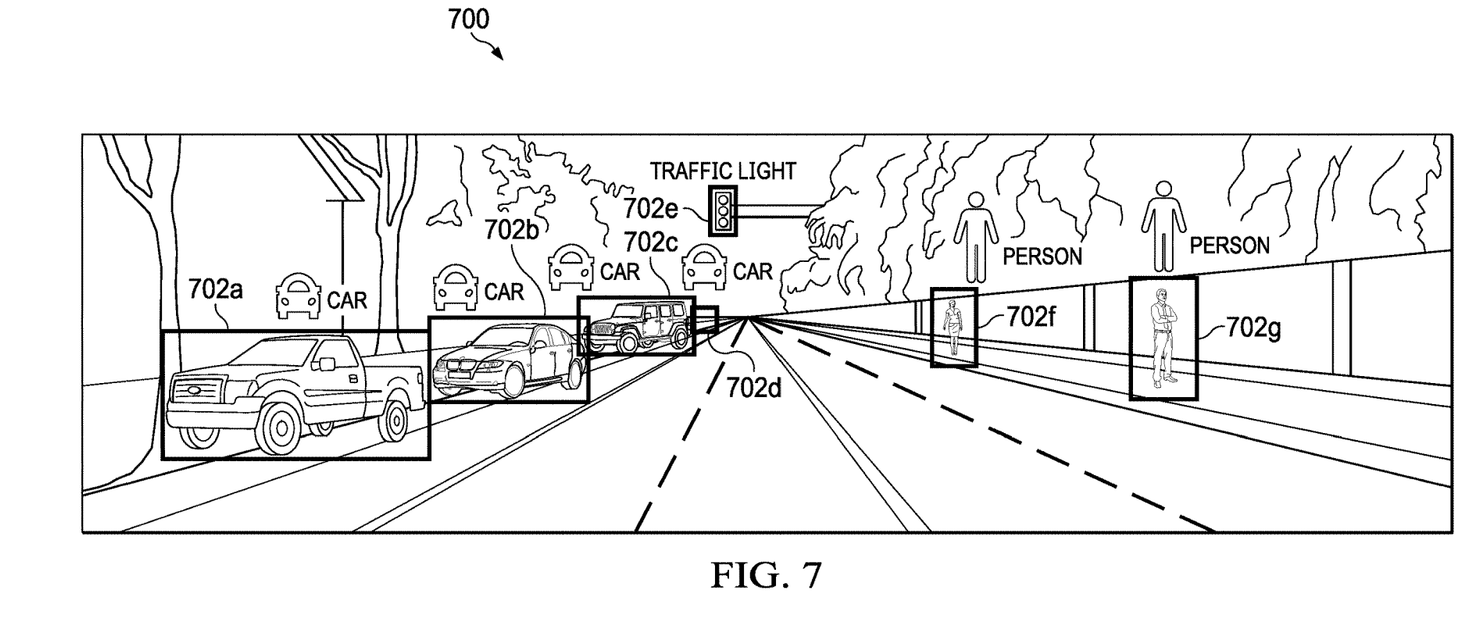
FIG. 7 is an object map of an image.

FIG. 7 illustrates an object map 702 of an image associated with a physical IMO. For example, the object map 702 can be generated using any of the computing environments 100, 200, 300, 400, 600, and specifically, the CNC platform 350, 400, and the digital representation 500. Specifically, the object map 702 can identify objects 702a, 702b, 702c, 702d, 702e, 702f, 702g (collectively referred to as objects 702).

Figure 8:
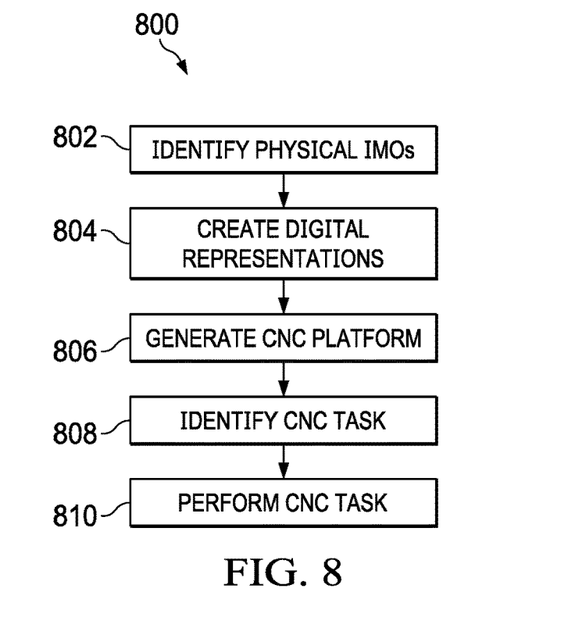
FIG. 8 is a flowchart depicting selected elements of an embodiment of a method for implementing cooperative networking computing platform.

FIG. 8 illustrates a flowchart depicting selected elements of an embodiment of a method 800 for collaborative sensing of physical IMOs The method 800 may be performed by the computing environments 100, 200, 300, 400, 600, the CNC platform 350, 400, and/or the digital representation 500 described herein with reference to FIGS. 1-7. It is noted that certain operations described in method 800 may be optional or may be rearranged in different embodiments.

Physical intelligent moving objects (IMOs) 303 are identified (802). Digital representations 310a are created for a subset of the physical IMOs—physical IMOs 303a—in the edge cloud 302 of the cloud computing environment 300 (804). Each digital representations 310a is representative of a particular physical IMO 303a of the physical IMOs 303a. The CNC platform 350 is created (806). The CNC platform 350 includes the digital representations 310a of the physical IMOs 303a. Each digital representation 310a functions as a CNC entity in the CNC platform 350 for the corresponding physical IMO 303a. A CNC task is identified of a physical IMO 303a (808). The CNC task is performed by the digital representation 310a that corresponds to the physical IMO 303a (810). Performing the CNC task can include accessing data associated with another digital representation 310a in the CNC platform 350 to perform the CNC task at the digital representation 310a.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
   identifying a plurality of physical intelligent moving objects (IMOs);

creating, for a first subset of the physical IMOs, a plurality of digital representations in one or more edge clouds of a distributed cloud computing environment, each digital representation representative of a physical IMO of the first subset of the physical IMOs;

generating a cooperative network computing (CNC) platform that includes the digital representations of the first subset of the physical IMOs, each digital representation functioning as a CNC entity in the CNC platform for the corresponding physical IMO;

identifying a CNC task of a first physical IMO of the plurality of physical IMOs; and performing, by a first digital representation of the plurality of digital representations that corresponds to the first physical IMO, the CNC task in the CNC platform, including accessing data associated with a second digital representation of the plurality of digital representations in the CNC platform to perform the CNC task at the first digital representation.

2. The computer-implemented method of claim 1, wherein performing the CNC task includes relaying data, by the first digital representation, to a third digital representation of the plurality of digital representations.

3. The computer-implemented method of claim 1, wherein performing the CNC task includes caching, at the first digital representation, the data accessed from the second digital representation of the plurality of digital representations.

4. The computer-implemented method of claim 1, wherein performing the CNC task includes relaying, at the first digital representation, data resulting from a function implemented to perform the CNC task at the first digital representation to a third digital representation of the plurality of digital representations.

5. The computer-implemented method of claim 1, wherein performing the CNC task includes caching, at the first digital representation, data resulting from a function implemented to perform the CNC task at the first digital representation.

6. The computer-implemented method of claim 1, further comprising:
creating, for a second subset of the physical IMOs, a respective digital representation of the physical IMO in a core cloud of the distributed cloud computing environment,
wherein generating the CNC platform further includes generating the CNC platform that includes the digital representations of the first and the second subset of the physical IMOs.

7. The computer-implemented method of claim 1, further comprising:
creating, for a second subset of the physical IMOs, a respective digital representation of the physical IMO at the physical IMO,
wherein generating the CNC platform further includes generating the CNC platform that includes the digital representations of the first and the second subset of the physical IMOs.

8. The computer-implemented method of claim 1, further comprising:
creating, for a second subset of the physical IMOs, a respective digital representation of the physical IMO in a core cloud of the distributed cloud computing environment; and
creating, for a third subset of the physical IMOs, a respective digital representation of the physical IMO at the physical IMO,
wherein generating the CNC platform further includes generating the CNC platform that includes the digital representations of the first subset, the second subset, and the third subset of the physical IMOs.

9. A system comprising a processor having access to memory media storing instructions executable by the processor to perform operations comprising:
identifying a plurality of physical intelligent moving objects (IMOs);
creating, for a first subset of the physical IMOs, a plurality of digital representations in one or more edge clouds of a distributed cloud computing environment, each digital representation representative of a physical IMO of the first subset of the physical IMOs;
generating a cooperative network computing (CNC) platform that includes the digital representations of the first subset of the physical IMOs, each digital representation functioning as a CNC entity in the CNC platform for the corresponding physical IMO;
identifying a CNC task of a first physical IMO of the plurality of physical IMOs; and
performing, by a first digital representation of the plurality of digital representations that corresponds to the first physical IMO, the CNC task in the CNC platform, including accessing data associated with a second digital representation of the plurality of digital representations in the CNC platform to perform the CNC task at the first digital representation.

10. The system of claim 9, wherein the operation of performing the CNC task further includes relaying data, by the first digital representation, to a third digital representation of the plurality of digital representations.

11. The system of claim 9, wherein the operation of performing the CNC task further includes caching, at the first digital representation, the data accessed from the second digital representation of the plurality of digital representations.

12. The system of claim 9, the operation of performing the CNC task further includes relaying, at the first digital representation, data resulting from a function implemented to perform the CNC task at the first digital representation to a third digital representation of the plurality of digital representations.

13. The system of claim 9, the operation of performing the CNC task further includes caching, at the first digital representation, data resulting from a function implemented to perform the CNC task at the first digital representation.

14. The system of claim 9, the operations further comprising:
creating, for a second subset of the physical IMOs, a respective digital representation of the physical IMO in a core cloud of the distributed cloud computing environment,
wherein generating the CNC platform further includes generating the CNC platform that includes the digital representations of the first and the second subset of the physical IMOs.

15. The system of claim 9, the operations further comprising:
creating, for a second subset of the physical IMOs, a respective digital representation of the physical IMO at the physical IMO,
wherein generating the CNC platform further includes generating the CNC platform that includes the digital representations of the first and the second subset of the physical IMOs.

16. The system of claim 9, the operations further comprising:
    creating, for a second subset of the physical IMOs, a respective digital representation of the physical IMO in a core cloud of the distributed cloud computing environment; and
    creating, for a third subset of the physical IMOs, a respective digital representation of the physical IMO at the physical IMO,
    wherein generating the CNC platform further includes generating the CNC platform that includes the digital representations of the first subset, the second subset, and the third subset of the physical IMOs.

\* \* \* \* \*